Dec. 15, 1964 W. SCHMIDT 3,160,971
APPARATUS FOR PRODUCING LUMINOUS IMAGES WHICH APPEAR TO FLOAT
IN SPACE AND ARE EQUALLY VISIBLE FROM ANY ANGLE OF VIEW
Filed Dec. 23, 1958 3 Sheets-Sheet 1

INVENTOR
WILHELM SCHMIDT
BY
ATTORNEY

Dec. 15, 1964 W. SCHMIDT 3,160,971
APPARATUS FOR PRODUCING LUMINOUS IMAGES WHICH APPEAR TO FLOAT
IN SPACE AND ARE EQUALLY VISIBLE FROM ANY ANGLE OF VIEW
Filed Dec. 23, 1958 3 Sheets-Sheet 2

INVENTOR
WILHELM SCHMIDT
BY
ATTORNEY

United States Patent Office 3,160,971
Patented Dec. 15, 1964

3,160,971
APPARATUS FOR PRODUCING LUMINOUS IMAGES WHICH APPEAR TO FLOAT IN SPACE AND ARE EQUALLY VISIBLE FROM ANY ANGLE OF VIEW
Wilhelm Schmidt, Berlin-Schmargendorf, Germany, assignor to Rotavision G.m.b.H., Basel, Switzerland, a corporation of Switzerland
Filed Dec. 23, 1958, Ser. No. 782,459
10 Claims. (Cl. 40—77)

This invention relates to apparatus for producing luminous images which appear to float in space and which are equally visible from any angle of view. Such devices which are especially useful for advertising displays but which may also serve other purposes create the illusion of a luminous image which has the same unchanged appearance irrespectively of the angle from which an observer may look at the image-producing apparatus.

A know method of producing luminous images which appear to float in space is by means of a prismatic hollow body which revolves about a vertical axis and which is provided with an axial observation slot for each image that is to be displayed. Behind the slot is the actual image which participates in the rotation and which is embodied in a transparency illuminated by a light source located in the centre of the hollow prismatic body. If it is desired to display separate images by means of the same reproducing device, a rotatable inner cylinder surrounding the light source is arranged to permit only one image or the images of only one set to be illuminated at any one time in such manner that after a predetermined number of revolutions a change-over is automatically effected to a following image or set of images in the device.

A major disadvantage of apparatus of this kind for producing illuminated floating images is that it is loaded with normally constituted and proportioned transparencies. This gives rise to the undesirable optical illusion of the images being expanded in width nearly to the extent of the diameter of the rotating device. The reason for this is that the image which travels along a path which is convex towards the observer can be seen in its course for a comparatively long period of time.

It will be readily understood that the unnatural effect of an illuminated image appearing to be much too wide prohibits the practical application of the principle that has been described, excepting perhaps in individual cases such as in toys.

For producing universally visible illuminated floating images by means of rotary devices the present invention proposes to employ an arrangement wherein the illusion of correct undistorted images is secured by the use of transparencies bearing images which are compressed transversely across the longitudinal axis of the slot. By employing such unidirectionally compressed images the apparent image seen by the viewer will again be expanded to natural proportions, thus permitting the striking effects of rotating luminous image machines and the attraction they have on the general public to be exploited for the purposes of advertising display.

In principle, the laterally compressed transparency could be placed flat behind the observation slot. However, if this were done it would be necessary to adjust the scale of compression of the image accurately to the width of the slot, its distance from the slot and the peripheral speed of revolution, to ensure that the marginal zones of the image would be correctly displayed.

According to a preferred feature of the invention a transparency bearing an image which is distorted by affine compression is placed in circularly arcuate arrangement behind each observation slot in the revolving hollow body.

To achieve even more impressive results it may be a useful idea to provide additional slots in the side walls of the chambers which surround the rotating hollow prismatic body and to fit transparencies behind these slots as well. The overall image seen by the observer may thus be compounded of several component images.

Another improvement in the illusion can be achieved by providing means for the creation of additional revolving luminous shapes. This result may be achieved for example by making at least parts of the end and/or side walls of the chambers transparent and coloured, and by interposing contoured diaphragms between light source and the transparent windows or by placing them in front of the windows to limit visibility of the luminous revolving shape to only one portion thereof. The contoured diaphragms will at the same time provide better definition of the generatrix of the revolving luminous shape.

The required illumination is preferably achieved by mirrors on the inside of the walls of the chambers. It has been found expedient if the mirrors are curved in such a way as to ensure a uniform overall illumination of the transparencies in the chambers. Moreover, for maximum utilisation of the available illumination a useful arrangement is to provide inside the revolving inner cylinder a reflector which participates in the rotation and which is so curved that it will reflect as much as possible of the light emitted by the light source into the chamber that happens to be illuminated.

The high speeds of revolution the described revolving device must perform in order to expand the compressed images to natural size occasionally tend to produce undesirable vibration and noise which cannot be adequately suppressed by statically and dynamically balancing the revolving parts.

For suppressing out-of-balance vibrations another feature of the present apparatus therefore consists in the provision of an intermediate supporting member for carrying a revolving chambered plate as well as the motor and a mechanism for indexing the inner cylinder, and in mounting this intermediate member on the baseplate which carries the light source with the interposition of peripherally or centrally disposed springs. On the one hand, this arrangement will operate to prolong the life of the light source and on the other it will substantially reduce the noise generated by the rotary motion.

For producing images compressed by affine geometrical transformation the usual methods of draughtsmanship can, of course, be employed. However, in order to satisfy the requirements of good natural reproduction which is a matter of importance in advertising displays it is proposed by the invention to use a photomechanical process which consists in that a naturally proportioned picture is photographed with the axis of the objective obliquely inclined to the plane of the picture to produce perspective distortion in the photographed image, and that this image, possibly after enlargement, is then re-photographed at the same angle of obliquity but in mirror symmetry to the first with the foreshortened vertical edge of the distorted image placed nearest the camera objective.

The first oblique photograph produces convergence of the horizontals towards the objective, whereas the second oblique photograph eliminates this convergence and produces a unidirectional compression of the original with re-parallelised horizontal edges.

It will be readily understood that other modifications of the idea underlying the invention can be devised. For instance, in the described photo-mechanical process for compressing the original picture, the distorted intermediate image could be enlarged by projecting it on to a screen. It is then readily possible by empirically selecting an appropriate enlargement to check on a ground glass screen whether the convergence of the horizontals will be eliminated in the taking of the following photograph, and inaccuracies can be eliminated by changing the distance of the projection screen from the objective without changing the angle of view at which the second photograph is to be taken.

Another improvement of the proposed apparatus which applies to cases where the revolving device contains a plurality of transparencies would be to use a long interval indexing mechanism which does not require a train of gear wheels, which is both expensive and troublesome to maintain, in order to provide a considerable reduction ratio, but which makes use of two like pulleys on the shaft of the motor mounted on the intermediate plate, of which one pulley cooperates with a pulley integral with the revolving chamber carrier plate, whereas the other cooperates with a pulley which is rotatably mounted on the bush of the chamber carrier plate and differs slightly in diameter from the pulley integrally formed on the plate. One or two cams located on the loosely revolving pulley are arranged to cooperate with a two-prong gear which is rotatably connected with the driving element of a Maltese cross motion on the bottom of the inner cylinder.

A form of construction which incorporates two pulleys revolving at differential speeds permits the indexing intervals to be considerably lengthened with the help of a mechanism which comprises only cheap and readily maintained structural elements.

To permit the invention to be the more readily understood illustrative embodiments will now be described by reference to the accompanying drawings in which FIG. 1 is an axial section of the lower part of apparatue constructed in accordance with the present invention.

FIGS. 4 to 7 are various embodiments of the chambers provided in apparatus according to the invention;

Figure 1:
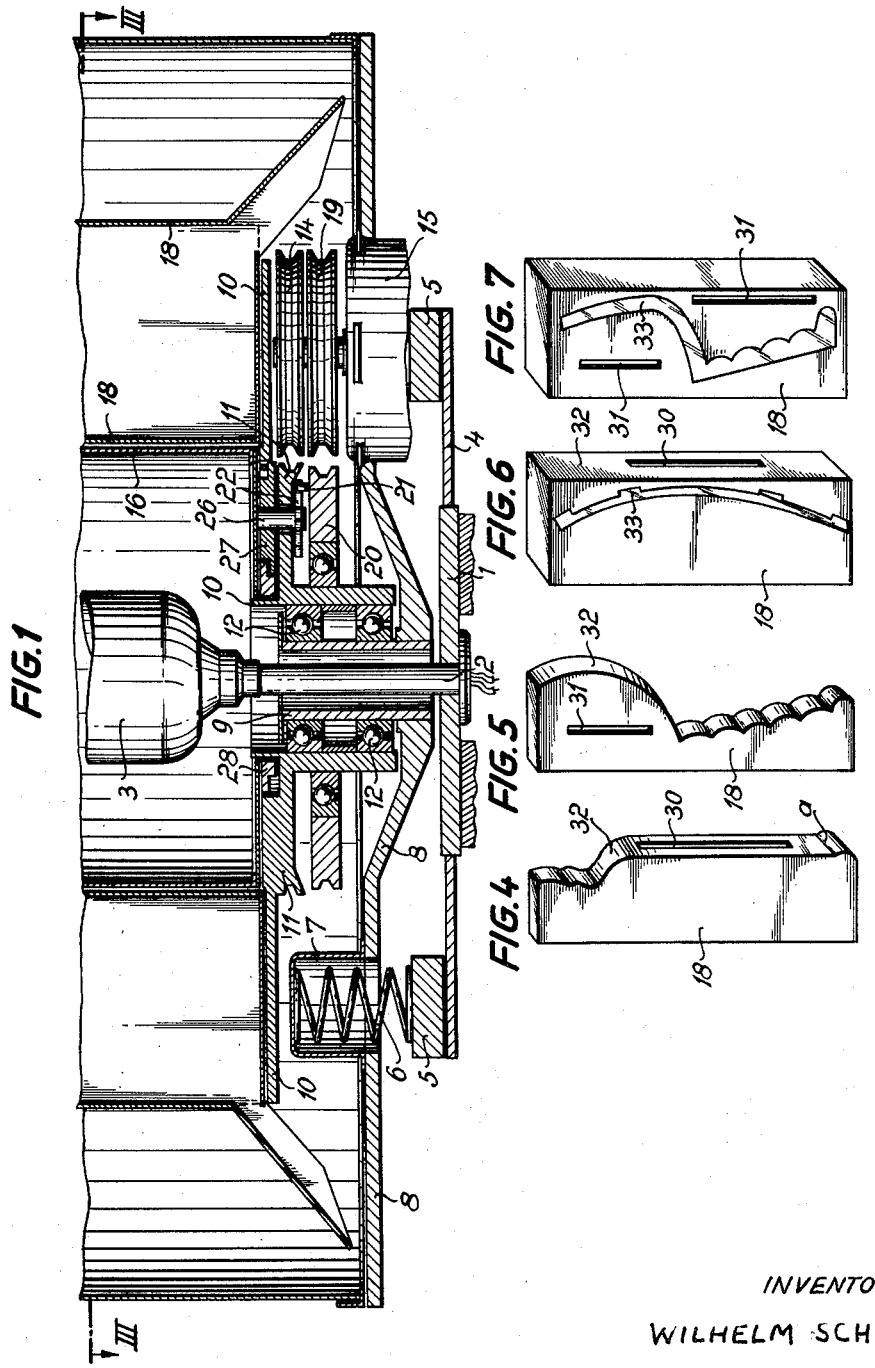

In FIG. 1 a baseplate 1 which carries the socket 2 for the central source of illumination 3 is fitted with a peripheral annular disc-shaped ring 4 of spring steel or the like, allowing sufficient clearance for the ring to be elastically deflected in the vertical direction.

Several blocks 5 loaded by springs 6 and preferably located at diametrically opposite points bear on ring 4. The upper ends of these springs 6 extend into cups 7 of an intermediate plate 8 which supports all the revolving parts including the motor and gearing.

This spring suspension prevents vibrations due to unbalance, the revolution of the motor, and the indexing motion, from having an undesirable effect on the light source 3.

In the centre of the intermediate plate 8 which is slightly dished without making actual contact with the baseplate 1, and which has an opening for the lamp socket 2, is a sleeve 9 coaxially surrounding the socket. Mounted on the sleeve 9 in roller bearings 12 is a rotating member 10 of which the underside is modified to form a pulley 11.

Figure 3:
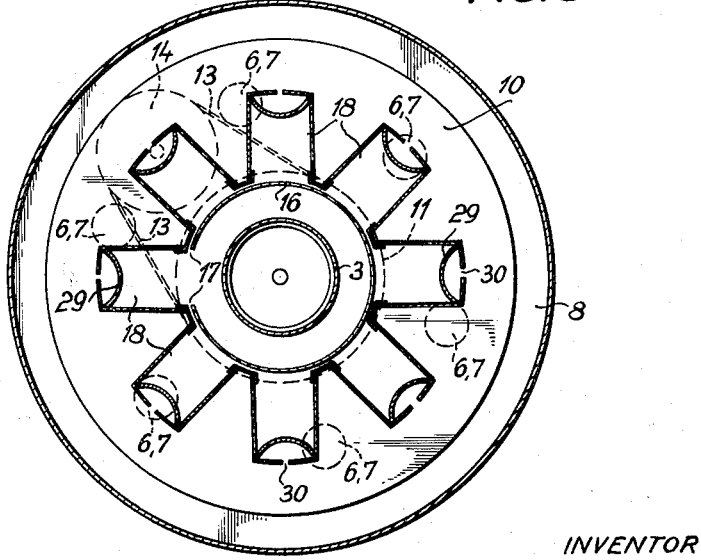
FIG. 3 is a cross section of FIG. 1, taken on the line III—III, on a smaller scale.

A belt 13 (cf. FIG. 3) connects pulley 11 with a pulley 14 secured to the shaft of motor 15. Mounted rotatably on and for rotation on the axis of the rotating member 10 is an inner cylinder 16 with one or more axial light apertures 17 which correspond with the width of the chambers (FIG. 3). Fast on the rotating member is an outside prismatic hollow body formed with chambers 18.

In FIGS. 1 and 3 it is assumed that the illustrated embodiment is intended for the consecutive display of a plurality of images, for instance each of the chambers 18 containing a different transparency. The inner cylinder 16 which rotates together with the outer prismatic body must therefore be indexed to bring its aperture 17 consecutively into register with the several chambers 18.

To permit this to be done, i.e. for the purpose of indexing the inner cylinder 16 into register with the next chamber 18 at the end of a predetermined display time, the invention prefers to provide a differential indexing mechanism. To this end the shaft of motor 15 carries, in addition to pulley 14, a second similar pulley 19 which, by means of a belt not specially shown to avoid overcomplicating the drawing, drives a pulley 20 mounted in a ball bearing on the hub of the rotating member 10 and thus capable of revolving in relation thereto.

According to the desired indexing frequency the diameter of pulley 20 is arranged to be slightly smaller than that of pulley 11 which is integrally formed on the rotating member 10. Consequently, the two pulleys 11 and 20 will revolve at slightly different speeds and a cam 21 on pulley 20 can therefore engage the rotatably mounted two-prong gear 22 and rotate the same through 180° from its original position whenever the cam overrides this gear.

Figure 2:
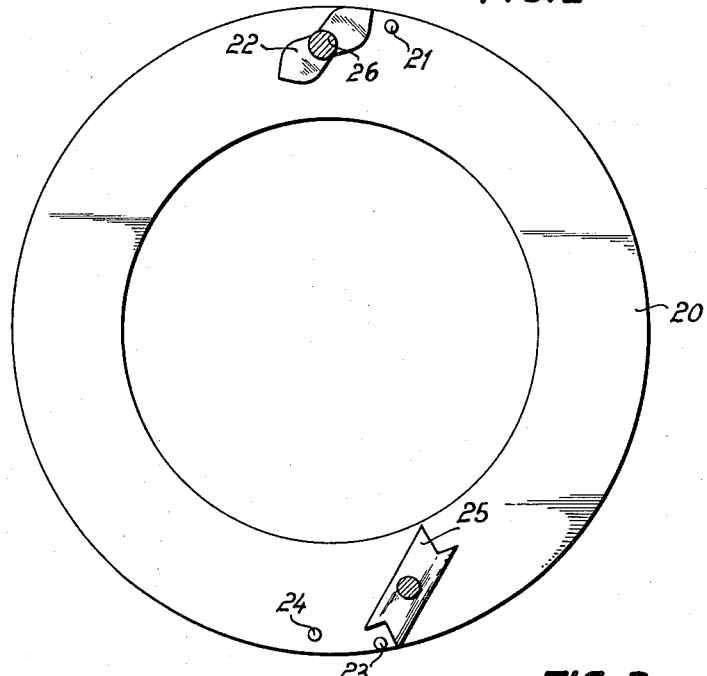
FIG. 2 is a schematic plan view of an indexing member functioning in the manner of a two-prong gear for use in apparatus displaying several images.

An alternative method of indexing the inner cylinder 16 is illustrated in FIG. 2. In this form of construction pulley 20 carries two cams 23 and 24 which engage a slightly different type of two-prong gear 25.

The two-prong gear 22 or 25 is fast on a shaft 26 mounted in the rotating member 10 and serves for operating the driving cam 27 of a Maltese cross motion 28, said cam being secured to the shaft on the top of the rotating member 10.

The Maltese cross 28 is itself mounted centrally and rotatably in the rotating member 10 and rigidly connected with the inner cylinder 16. Consequently, when as a result of the differential speeds of the two pulleys 20 and 11, cam 21 or the cams 23, 24 rotate the two-prong gear 22 or 25 through 360° cam 27 will be likewise rotated by the same amount and turn the Maltese cross 28 together with the inner cylinder 16 into a position in which its light aperture 17 is in register with the next following chamber 18 in the outer hollow prismatic body.

As indicated in FIG. 3 transparencies 29 bearing images which have been compressed by an affine transformation are inserted in the chambers 18, each transparency being in cross section arcuately disposed across the narrow slot 30 associated with the relative chamber. When the contrivance rotates the image seen by an observer will then appear to be located approximately in the median plane of the apparatus and to be as wide as the apparatus. The image which has been deliberately transversely compressed, i.e. narrowed in the horizontal direction, will thus be optically re-expanded and transformed into a correctly proportioned image which can now be seen from all angles equally well and which will appear to be floating in space.

To obtain supplementary effects it is proposed, according to another feature of the invention, at the same time to provide axial slots in the side walls of chambers 18 with illuminated transparencies of the described kind located behind them. This is illustrated in FIGS. 5 and 7 in the case of chambers which lack a slot in their front end faces (32, FIG. 5). However, slots may of course be provided both in the end face as well as in the side walls of the individual chambers in such manner that the image seen by an observer will be composed of several component images.

Another useful step is to make the end and/or side wall of the chambers 18 entirely or partly of a material 32 or 33 (FIGS. 4 to 7) which, though transparent to light, is not clear, such as for instance an opal glass. The result is that to an observer the image displayed through slots 30, 31 will appear to have an additional frame in the form of an arbitrarily shaped rotary luminous body, and, if desired, contoured diaphragms may be provided to limit visibility of the contoured rotary luminous body to a particular portion thereof.

Figure 8:
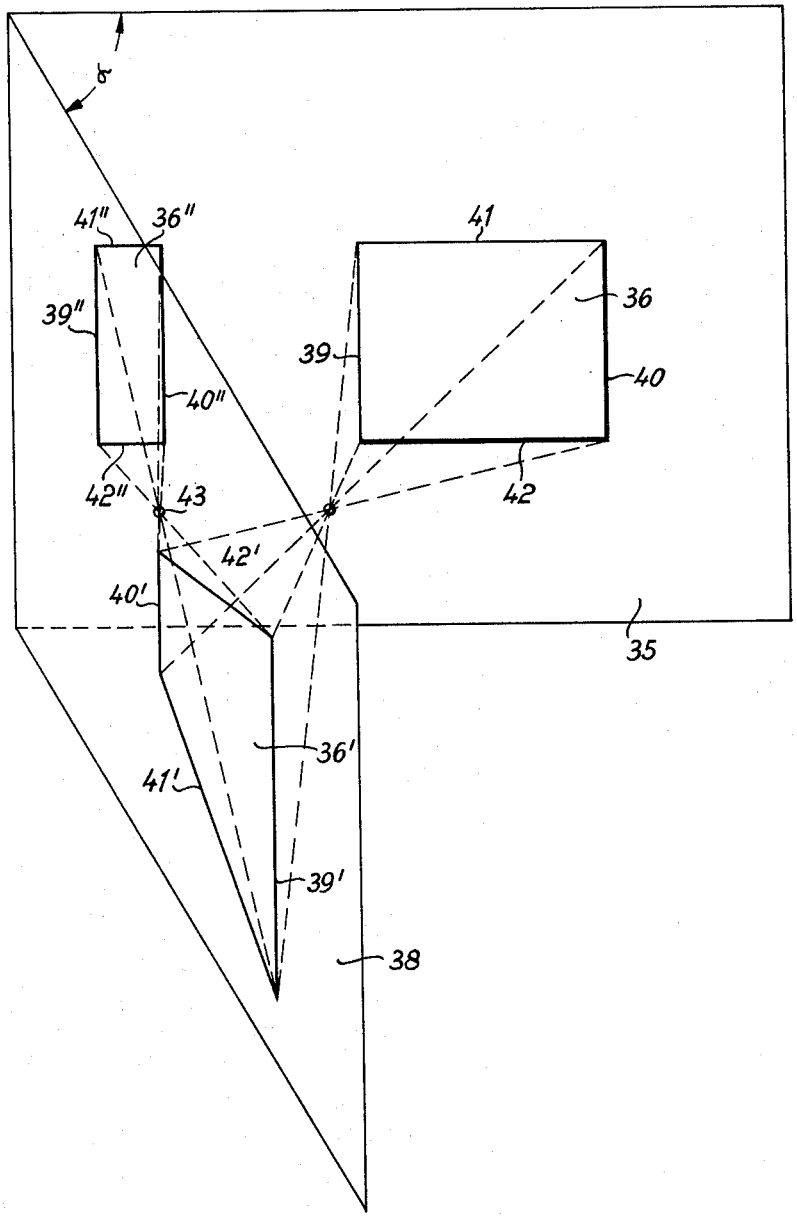
FIG. 8 is a diagrammatic illustration of the process of producing laterally compressed transparencies.

To illustrate the method whereby the compressed transparencies 29 are photomechanically produced, FIG. 8 illlustrates the geometry which underlies the production of an image which is compressed horizontally by an affine geometrical transformation.

In FIG. 8, 35 represents an imaginary vertical plane which contains the original image 36 which it is desired to compress. This image is projected on to a second vertical plane 38 by means of a photographic objective. The dihedral angle alpha between the two planes is selected according to the percentage compression required. The resultant intermediate image 36' has two characteristic features which are due to the distortion introduced by perspective. On the one hand, the vertical edges 39' and 40' which represent the original edges 39 and 40 now have different lengths and, on the other hand, the projections 41' and 42' of the horizontal edges converge towards the shorter vertical edge 40' and they are at the same time foreshortened so that the original image 36 has undergone a first stage transverse compression.

By means of a second objective 43 the intermediate image 36'—which may be a projected or a real image—is then projected back on to plane 35. The resultant projection 36" which is to take the place of image 29 in the manner proposed by the invention according to FIG. 3 is now further transversely compressed. At the same time the "droop" of the horizontal edges 41' and 42' is corrected in such manner that the horizontal edges 41" and 42" as well as the vertical edges 39" and 40" will again be orthogonal.

In detail the invention may, of course, be embodied in other ways than those which have been illustratively described. Moreover, many modifications or supplementary arrangements may be devised. For instance, to ensure that the images behind the lateral slots 31 will be fully illuminated the side walls of the chambers 18 may be provided with curved mirrors on their insides. Such mirrors could also be used inside the masking cylinder 16. On the other hand, rod-shaped lenses could be inserted in slots 30, 31 to collect the light rays.

The content of the images 29 is as such irrelevant to the invention. However, an advantageous application would be to use the device which creates the seemingly floating image in space to display a clock which can be seen from all sides. In principle it is quite immaterial whether the image of a clock or the clock itself is displayed through the slots (30, 31). A simple method of embodying a timepiece would be to provide the chambers 18 with images of numbers, representing for instance consecutive hours and to arrange that these are unmasked by the inner cylinder 16 in synchronism with the passage of the hours of day, whereas numbers representing minutes could be made visible in an additional unit operated at a suitable relative rate.

I claim:

1. Apparatus for displaying at least one luminous image apparently floating in space and visible from all sides, comprising a hollow rotatable body forming a plurality of radially arranged chambers, a light source located within the hollow of said body substantially on the axis of rotation of said body, said chambers being open towards the light source and having in their respective peripheral walls slots lying substantially parallel to said axis, a plurality of transparencies positioned in said chambers behind and in radially spaced relation to the respective slots and between said light source and said slots, each of said transparencies bearing an affine image of an original image to be displayed, said affine image having its image elements proportioned substantially as those of the original in the direction of said axis but substantially uniformly compressed into an image space substantially narrower proportionally than that of the original in the direction transverse to said axis, and means for rotating said body and said transparencies about said axis at a speed sufficient that from any of said transparencies a substantially correctly proportioned luminous image of the corresponding original, apparently floating in space, will be rendered visible from outside said body by light passing from said source through the corresponding affine image and the related slot.

2. Apparatus as claimed in claim 1, wherein said transparencies are bent into an arcuate form in the direction transverse to said axis and each of them is disposed between said light source and one of said slots with its concave side facing toward the slot.

3. Apparatus as claimed in claim 1, wherein said slots are in those walls of said chambers opposite to the light source.

4. Apparatus as claimed in claim 1, wherein said slots are in the radial side walls of said chambers.

5. Apparatus as claimed in claim 1, including mirrors at the inner faces of the walls of said chambers for ensuring uniform illumination of said transparencies.

6. Apparatus as claimed in claim 1, including a hollow cylinder surrounding said light source within said body, means for rotatably supporting said cylinder, means for rotating said cylinder with said body and means for rotating said cylinder stepwise relative to said body, said cylinder having an aperture parallel with its axis of revolution, said aperture being located to register with said chambers successively as said cylinder is rotated stepwise.

7. Apparatus as claimed in claim 6, wherein said means for rotating said cylinder relative to said body includes means to effect each stepwise movement thereof at the end of a predetermined number of revolutions of said cylinder with said body.

8. Apparatus as claimed in claim 6, including curved reflecting means lining said cylinder, said reflecting means directing light from said light source through said aperture.

9. Apparatus as claimed in claim 1, including a base plate, said light source being mounted on said base plate, and said means for rotatably supporting said body comprising a second plate located above and resiliently cushioned and supported upon said base plate by resilient cushioning and support means located between said base plate and said second plate.

10. Apparatus as claimed in claim 6, including a first pulley and a second pulley, means rotatably supporting said second pulley in axial alignment with said first pulley, a Maltese cross mechanism, said mechanism including a cam and a cross mounted on said first pulley, said cross being connected to said cylinder, a pin and two-pronged gear for rotating said cross, said two-pronged gear being connected to said cam and said pin being located on said second pulley to contact a prong of said two-pronged gear once in every revolution of said second pulley, means for driving said first pulley, means for driving said second pulley at a slightly faster rate than said first pulley, said means for rotating said cylinder with said prismatic body including said first pulley and said means for driving said first pulley, and said means for rotating said cylinder stepwise including said Maltese cross gear, said two-pronged gear and said pin, said second pulley and said means for driving said second pulley.

References Cited in the file of this patent

UNITED STATES PATENTS

| | | |
|---|---|---|
| 1,403,449 | Sandt | Jan. 10, 1922 |
| 1,782,834 | Wlodarski | Nov. 25, 1930 |
| 1,829,633 | Chretien | Oct. 27, 1931 |
| 1,829,634 | Chretien | Oct. 27, 1931 |
| 1,853,072 | Morioka | Apr. 12, 1932 |
| 2,134,150 | Schmidt | Oct. 25, 1938 |
| 2,167,563 | Castillon | July 25, 1939 |
| 2,607,268 | Bartz | Aug. 19, 1952 |
| 3,046,832 | Winzenburg | July 31, 1962 |

OTHER REFERENCES

Publication "American Cinematographer," May 1931, pages 36, 37.